(12) United States Patent
Gibson

(10) Patent No.: US 12,302,109 B2
(45) Date of Patent: May 13, 2025

(54) 5G CELL MULTI-CARRIER NEUTRALITY NETWORK SLICE SUPPORT

(71) Applicant: T-Mobile USA, Inc., Bellevue, WA (US)

(72) Inventor: Todd Gibson, Rowlett, TX (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 18/507,337

(22) Filed: Nov. 13, 2023

(65) Prior Publication Data

US 2024/0080676 A1    Mar. 7, 2024

Related U.S. Application Data

(63) Continuation of application No. 17/880,325, filed on Aug. 3, 2022, now Pat. No. 11,856,410, which is a continuation of application No. 16/845,675, filed on Apr. 10, 2020, now Pat. No. 11,418,963.

(60) Provisional application No. 62/845,796, filed on May 9, 2019.

(51) Int. Cl.
*H04W 4/00* (2018.01)
*H04W 16/02* (2009.01)

(52) U.S. Cl.
CPC .................. *H04W 16/02* (2013.01)

(58) Field of Classification Search
CPC ..... H04W 72/04; H04W 72/12; H04W 72/50; H04W 72/512; H04W 76/00; H04W 16/02
See application file for complete search history.

(56) References Cited

U.S. PATENT DOCUMENTS

| | | | |
|---|---|---|---|
| 10,637,753 B1 | 4/2020 | Taft et al. | |
| 11,418,963 B2 | 8/2022 | Gibson | |
| 11,856,410 B2 | 12/2023 | Gibson | |
| 2017/0264535 A1* | 9/2017 | Choi | H04W 48/16 |
| 2018/0077023 A1* | 3/2018 | Zhang | H04L 41/0806 |
| 2018/0278466 A1* | 9/2018 | McCormick | H04L 41/0896 |
| 2018/0324663 A1 | 11/2018 | Park et al. | |
| 2019/0200285 A1* | 6/2019 | Velev | H04W 8/08 |
| 2019/0239154 A1 | 8/2019 | Horn et al. | |
| 2020/0120589 A1 | 4/2020 | Velev et al. | |
| 2020/0236670 A1* | 7/2020 | Xiong | H04L 1/1812 |
| 2020/0267623 A1 | 8/2020 | Altay et al. | |
| 2021/0289351 A1 | 9/2021 | Ferdi et al. | |
| 2022/0053416 A1* | 2/2022 | Salkintzis | H04W 48/18 |

* cited by examiner

*Primary Examiner* — Shantell L Heiber
(74) *Attorney, Agent, or Firm* — Perkins Coie LLP

(57) ABSTRACT

The disclosed technology provides a system and method for provisioning network resource slices to wireless network operators where the network slices are supported by a single modular cell (e.g., a small cell) shared between, e.g., multiple different wireless network operators.

20 Claims, 8 Drawing Sheets

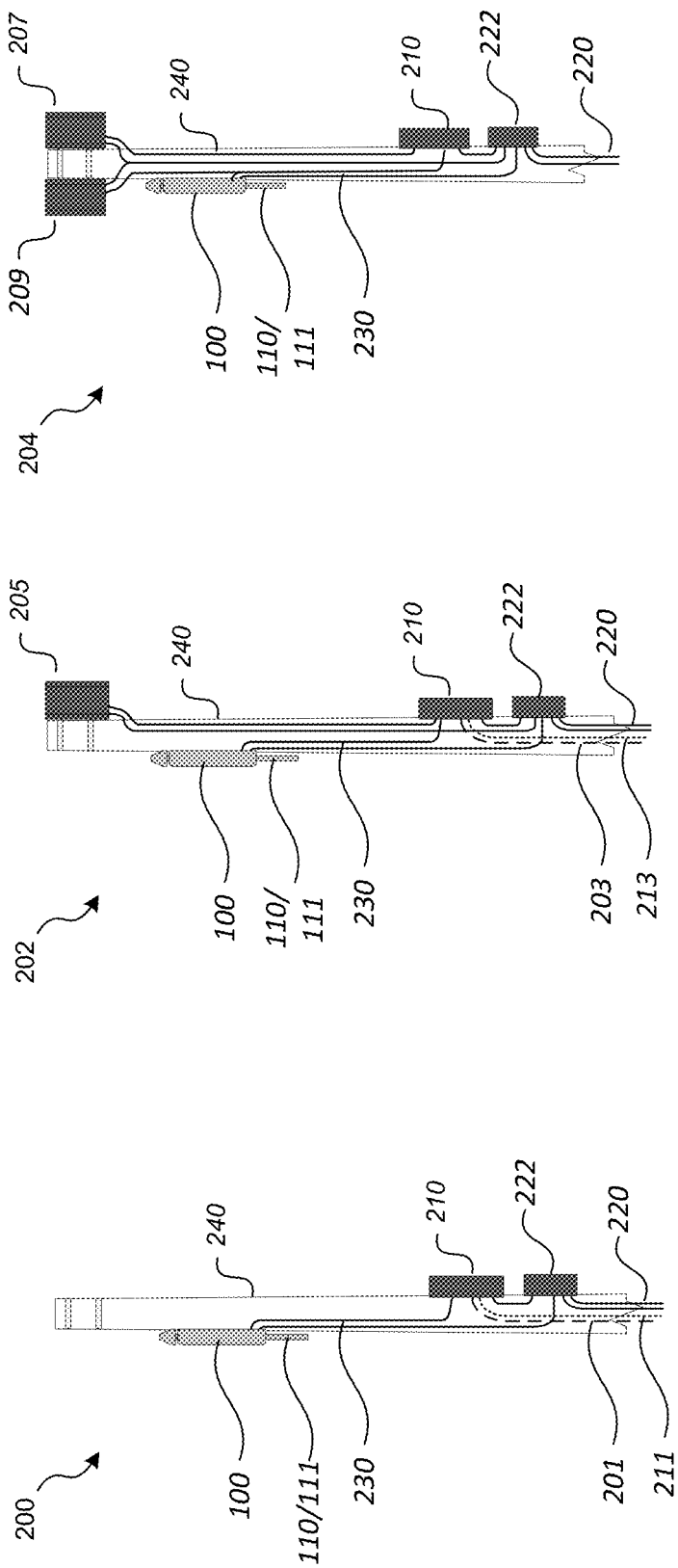

5G CELL MULTI-CARRIER NEUTRALITY NETWORK SLICE SUPPORT

CROSS-REFERENCE TO RELATED APPLICATIONS

This application is a continuation of U.S. patent application Ser. No. 17/880,325, entitled "5G CELL MULTI-CARRIER NEUTRALITY NETWORK SLICE SUPPORT," filed on Aug. 3, 2022, which is a continuation of U.S. patent application Ser. No. 16/845,675, entitled "5G CELL MULTI-CARRIER NEUTRALITY NETWORK SLICE SUPPORT," filed on Apr. 10, 2020, now issued as U.S. Pat. No. 11,418,963, which claims priority to and benefit from U.S. Provisional Patent Application No. 62/845,796, entitled "5G CELL MULTI-CARRIER NEUTRALITY NETWORK SLICE SUPPORT," filed on May 9, 2019, which are hereby incorporated by reference in their entireties.

BACKGROUND

5G New Radio (NR) is expected to deliver considerable data capacity and support ultra-reliable low latency communication (URLLC) which will enable a variety of use cases including autonomous vehicles, remote surgery, drone-based home delivery, virtual and augmented reality and more. A high concentration of 5G enabled cellular radios will be required to meet 5G's capacity and latency requirements in high-density environments (e.g., urban core, multi-family facilities, high-capacity venues). Dense cell deployments, including a dense concentration of macro cells and small cells, will allow 5G cellular operators to deliver a high-quality network experience.

BRIEF DESCRIPTION OF THE DRAWINGS

FIG. 2A is a block diagram of a modular small cell for multi-carrier network slicing using fiber fronthaul and/or backhaul.

FIG. 2B is a block diagram of a modular small cell for multi-carrier network slicing using fiber and microwave fronthaul and/or backhaul.

FIG. 2C is a block diagram of a modular small cell for multi-carrier network slicing using microwave fronthaul and/or backhaul.

DETAILED DESCRIPTION

Figures 1A, 1B, 1C:
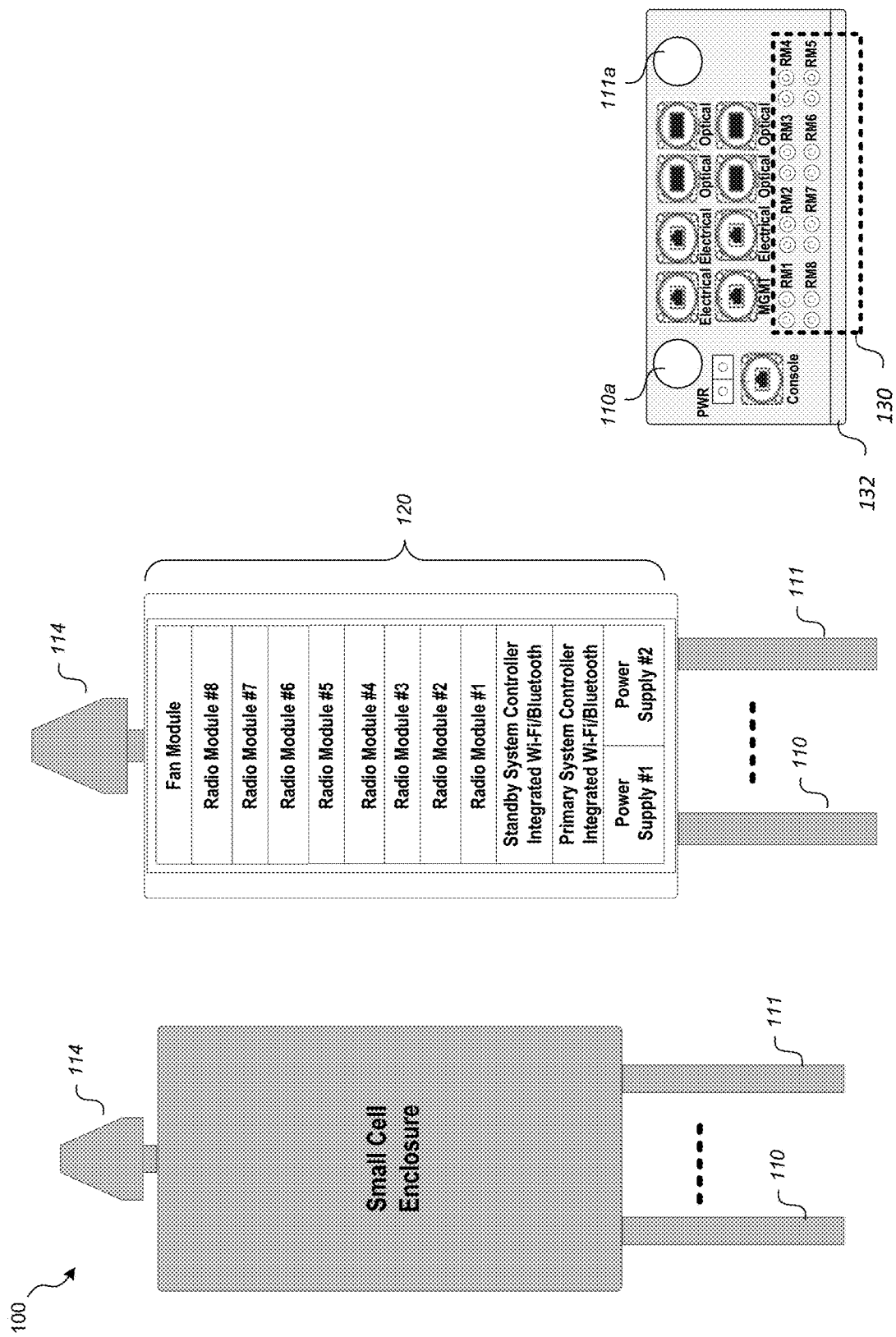
FIG. 1A is a block diagram of a modular small cell for multi-carrier network slicing.
FIG. 1B is a block diagram illustrating representative modules for a multi-carrier network slicing modular small cell.
FIG. 1C is a diagram illustrating representative port connections for a multi-carrier network slicing modular small cell.

Deploying new cell sites (both macro and small cell sites) in the density required to support 5G's increased data throughput can be challenging for a variety of reasons. For example, carriers must negotiate siting contracts or access to public rights of way with individual municipalities and obtain site leases from real-estate owners to install cells (e.g., small cells). The carriers must ensure that the small cells meet all structural constraints for wind and weight load on existing sites. Additionally, it is difficult to maintain aesthetics when multiple cellular operators install hardware on visible structures, and difficult to coordinate hardware concealment strategies if hardware concealment is proposed to alleviate the aesthetic concerns.

To provide optimal coverage and throughput to their subscribers, each carrier typically rushes to select strategically located sites to deploy cellular radios. Typically, the first carrier on the site to negotiate with the municipality, property owner, utility company, roadway authority, etc., obtains a competitive advantage particularly where the site cannot support multiple carriers, for example, because of aesthetics or structural loading limits. This race to deploy on the most optimal sites applies not just to small cell sites but also to macro cell sites installed on rooftops, water towers, and other non-traditional cell tower deployment locations.

To address the challenges of, for example, structural limitations on the number of carrier radios that can be deployed at a site, or aesthetic limitations on the number of such radios that can aesthetically pleasing for a given site, distributed antenna systems (DAS) have been proposed that use passive antennas and/or remote radio heads. However, DAS systems do not scale well to the demands of increasing performance (e.g., performance enhancements that will result from 5G NR evolution). There is, therefore, a need for a scalable solution that can overcome these and other challenges as well as leverage the capabilities and architecture of 5G NR.

The disclosed technology enables systems and method for provisioning network slices among wireless network operators (e.g., 5G NR network operators/carriers) where the network slices are supported by a single modular cell (e.g., modular small cell radios) shared between multiple wireless network operators. Each wireless network operator or wireless service provider is independent of the other and each owns and manages separate wireless networks independent of the other (e.g., one operator is not a mobile virtual network operator (MVNO) of another operator). Each network slice is a logical network that provides specific network capabilities and network characteristics. One benefit of such network slicing is the ability to share resources among operators, e.g., public small cells deployed by municipalities within public spaces (though many other uses are possible). Additionally, the ability to share network equipment among multiple operators alleviates structural concerns at strategic sites (e.g., weight loading allowed on utility poles and other structures), alleviates aesthetic concerns (e.g., avoids multiple haphazardly installed radio equipment in publicly visible locations), and allows the solution to easily scale to meet market demands unlike, for example, existing outdoor DAS solutions.

Various embodiments of the invention will now be described. The following description provides specific details for a thorough understanding and an enabling description of these embodiments. One skilled in the art will understand, however, that the invention can be practiced without many of these details. Additionally, some well-known structures or functions may not be shown or described in detail, to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

FIG. 1A is a block diagram of a modular small cell 100 for multi-carrier network slicing. With the challenges from zoning and permitting required for traditional small cell deployments, the modular small cell 100 can be network neutral and enable multi-carrier (multi-operator) use via individual network slices for each carrier/operator (e.g., a 5G NR slice per operator). That is, a single modular small cell 100 can allocate separate network slices for each of multiple operators, thereby alleviating the need for each operator to deploy individual small cell hardware. The modular small cell 100 can include a modular or fixed enclosure to protect the internal electrical components from tampering and adverse environmental conditions including water and dust ingress, sun exposure, temperature, humidity, etc. As shown in FIG. 1B, the modular small cell 100 can include one more AC or DC power supplies, and a secondary power supply for redundancy or for additional electrical capacity based on current loading (e.g., number of concurrent slices being supported at the time).

The modular small cell 100 can be deployed as an indoor distributed antenna system (DAS) solution, femtocell, picocell, microcell, etc. Alternatively or additionally, the small cell 100 can be mounted outdoors on street light poles, utility poles, kiosk, rooftops, etc., and powered by a utility feed, gas/diesel generator, battery bank, wind turbine, and/or solar panel(s). The modular small cell 100 can be mounted with various installation options including monopole, self-supporting tower, guy-wired supported tower, roof mounts and/or skids, wall mounts, kiosk mounts, water towers, billboards, street light poles, utility poles, Cell on Wheels (COW) trailers, Cell on Light Truck (COLT), emergency response vehicles, etc. The compact modular small cell 100 chassis avoids having separate hardware installed by each carrier/operator and provides a unified and modular solution that mirrors an indoor DAS cabinet because each carrier can operate its own radio within the single chassis. Each carrier's separate radio module can transmit on that carrier's licensed bands. Alternatively or additionally, multiple operators can share radio modules (e.g., for unlicensed operation). For example, the radio modules can be software reconfigurable to support multiple operator radio access technologies and frequency bands (e.g., a software radio access network (RAN)). In some embodiments, the Network Slice Selection Assistance Information (NSSAI) value or a Network Slice instance value can be used as a module identifier.

In some embodiments, the modular small cell 100 includes a processor and memory (e.g., a non-transitory memory) to run a system controller to control and manage the radio modules and to switch internal and/or external antennas to radio modules. For example, the modular small cell 100 can include different multi-band antennas tuned to different 5G NR radio bands and the system controller can allocate one or more antennas tuned to a radio module depending on what frequency band or bands the radio module is configured to operate on. In addition to memory to store instructions to implement the multi-carrier neutrality slicing, volatile and non-volatile memory can also be provided to store configuration information (e.g., antenna configuration data for antenna tuning or antenna allocation to a radio module), logs, and for transport buffer for QoS queues. A secondary system controller can provide failover support if the primary system controller fails or is taken out of service.

In some embodiments, the modular small cell 100 can also include one or more of the following components: a local console interface for system access; Wi-Fi and/or Bluetooth modules for wireless system access; a management interface for remote management (e.g., SNMP, Netconf, etc.); electrical and/or optical Ethernet interfaces; Ethernet frame switching, IP packet routing, and/or bridging of radio and/or Ethernet related interfaces; a module or component to process control plane traffic; a module or component to process user data plane traffic to/from the client end-point compute equipment (i.e. smartphones, IoT devices, sensors, etc.); components providing for remote access functionalities (i.e. telnet, SSH, HTTP(s), REST, TLS, SNMP); GPS integration with a GPS antenna; operations support system (OSS) components including system to support event logging locally or to a syslog server host, event and performance remote alarms and monitoring.

FIG. 1B is a block diagram illustrating representative modules 120 for the multi-carrier network slicing modular small cell 100. The small cell 100 can be deployed in an all-in-one solution where the modules 120, base band modems, antennas, transport interfaces, management interfaces, local interfaces, processing units, GPS modems/radios/antennas, and power suppliers are co-located. Alternatively, one or more of the above components can be physically separated and installed in a different location proximate to the small cell site (i.e., split-mount solution). The modules 120 can include radio modules for different operators to operate on different frequency bands and include unlicensed radio modules such as IEEE WLAN modules (e.g., Wi-Fi) or Citizens Broadband Radio Service (CBRS) modules to support unlicensed frequency operation. One or more radio modules can be dedicated to individual operators and can support specific frequency bands that the operator is licensed to operate. Additionally, radio modules can support more than one radio frequency band (i.e., multi-band radio modules). The modular small cell 100 can share embedded and/or external wideband or multi-band antennas to thereby minimize the antenna footprint.

The radio modules can be bridged to specific optical and/or electrical interfaces for Ethernet or Wave Division Multiplexing (WDM) and can support various backhaul, midhaul, or fronthaul technologies, e.g., Ethernet, WDM, Common Public Radio Interface (CPRI), enhanced CPRI (eCPRI), Open Base Station Architecture Initiative (OB-SAI), etc. For example, the radio modules can be configured into specific multiprotocol label switching (MPLS) virtual private networks (VPNs) to enable private 5G core network integration and/or peering at local and/or regional facilities.

In some embodiments, the modular small cell 100 can include a fan module to cool the small cell, a GPS timing antenna 114, and one or more wide-band antennas including antenna 110 and antenna 111. By using multiple antennas, the small cell 100 can provide MIMO spatial multiplexing and beamforming to increase the spectral efficiency for each supported network slice. In some embodiments, antennas 110 and 111 are directional, bi-directional, omnidirectional, phased array, sectorized, etc. and can be vertically, horizontally, or circularly polarized to support different deployment scenarios. In some embodiments, the modular small cell 100 can include multiple wideband or narrow band antennas each supporting one or more frequency bands, and which can be multiplexed to one or more radio modules for concurrent transmit/receive operations.

FIG. 1C is a block diagram illustrating representative port connections for the modular small cell 100. The small cell 100 includes several ports accessible through access door 132. This includes ports 110*a* and 111*a* for attaching wideband MIMO antennas (e.g., antenna 110 and 111) and external antenna ports 130 for attaching external antennas to one or more radio modules of the modules 120. The external antennas can be tuned to the frequency band that each operator's radio access technology (RAT) uses for their individual network slice. This can include unlicensed frequency bands.

FIGS. 2A, 2B, and 2C are block diagrams of representative small cell deployments. The representative small cell systems or sites incorporate the small cells 100 to provide multi-carrier network slicing at the site. Each small cell site of FIGS. 2A, 2B, and 2C includes an optional cell site router (CSR) 210. The small cells 100 are powered from a utility power feed 220 through a power load panel 222. The power load panel 222 provides, for example, AC, DC or Power-over-Ethernet (POE). The small cells 100 can be mounted on street light or utility poles 240 and can be coupled to the CSRs 210 via shielded electrical/optical ethernet cables 230. The small cells 100 can also include wideband MIMO antennas 110/111 to allow communication with devices (e.g., communication with user equipment (UEs)) from different carriers operating in different frequency bands. Although described with respect to small cells, the disclosed technology applies to macro cell sites as well and any reference to "small cells" in this description can be interchangeably replaced with "macro cells." Similarly, the disclosed technology applies equally to all forms for small cells, such as picocells, femtocells, all matter of IEEE 802.11 access points, even Bluetooth, IEEE 802.15, and other short-range wireless access points.

FIG. 2A represents a small cell site 200 using fiber only backhaul and/or fronthaul. In some embodiments, the backhaul and/or fronthaul of small cell 100 can be through fiber pairs 201 towards a local facility and an optional backhaul and/or front-haul can be through fiber optic pairs 211 to another small cell site. The small cell and fronthaul network can be based on Common Public Radio Interface (CPRI), enhanced CPRI (eCPRI), Open Base Station Architecture Initiative (OBSAI) specifications, extensible Radio Access Network (xRAN) architecture, etc., so that the small cell radio functions as a remote radio head (RRH). In some embodiments, multi-tenant providers can terminate separate fiber optic connections to a centralized breakout point (e.g., local facility) and can support Dense Wavelength Division Multiplexing (DWDM) or Coarse Wavelength Division Multiplexing (CWDM) optical transport to the centralized breakout point/local facility (where each tenant can be assigned a specific color on a shared fiber pair). Additionally, multi-tenant small cell clusters can support termination of separate fiber optic and/or electrical connections into the cell site. The small cell site 200 (e.g., 5G small cell sites) can support eCPRI terminations at a centralized base station controller allowing for a centralized management of the small cells. The individual network slices can also terminate on individual operator base station controllers.

FIG. 2B represents a small cell site 202 using both fiber and microwave backhauls and/or fronthauls. In some embodiments, the backhaul of small cell site 202 towards a local facility can be through fiber optic pairs 203 or can be through a microwave radio 205. Alternatively, the fronthaul of small cell site 202 to another small cell site can be through fiber optic pairs 203, fiber optic pairs 213, or the microwave radio 205.

FIG. 2C represents a small cell site 204 using only a microwave backhaul and/or fronthaul. In some embodiments, the backhaul and/or fronthaul of a small cell site 204 towards a local facility can be through a microwave radio 207 and include an optional backhaul and/or front-haul to another small cell site through another microwave radio 209.

Figure 3:
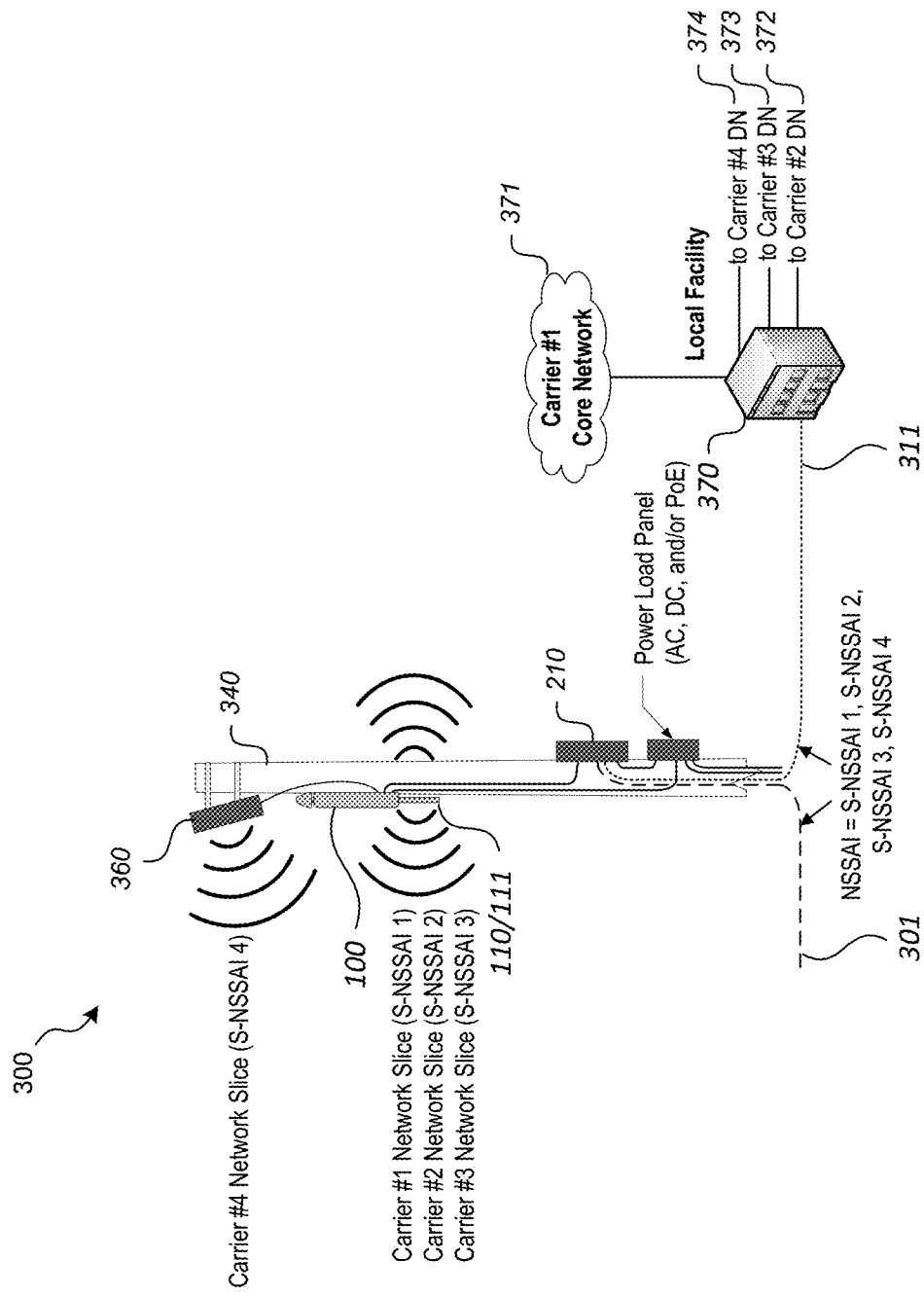
FIG. 3 is a block diagram of a representative small cell supporting multi-carrier network slicing using single or shared interfaces for network slices.

FIG. 3 is a block diagram of a small cell site 300 with small cell 100 supporting multi-carrier network slicing. In some embodiments, the small cell site 300 is deployed with layer 3 routing using the cell site router (CSR) 210. In other embodiments, the small cell site 300 includes layer 2 switching using a separate switch (not shown in FIG. 3) which can be integrated within the small cell site 300. Routing (e.g., with CSR) 210 or switching can be implemented with a stand-alone appliance (hardware solution) or software function co-located with or remotely located from the small cell site 300.

The small cell site 300 can include wideband MIMO antennas 110/111 to support multi-carrier network slices identified by Single Network Slice Selection Assistance Information (S-NSSAI) identities, for example, S-NSSAI 1 signaled by a User Equipment (UE) operating on carrier 1's network slice; S-NSSAI 2 signaled by a UE operating on carrier 2's network slice; S-NSSAI 3's signaled by a UE operating on carrier 3 network slice, etc. An external antenna 360 can support S-NSSAI 4 signaled by a UE operating on carrier 4's network slice, for example, etc. In some embodiments, the S-NSSAI is used to indicate the slice requested (i.e., assistance information for the network to provide the requested slice) and is also used as an identifier for the provisioned slice. In other embodiments a different identifier is used to identify the provisioned slice(s).

The network slices can be enabled on one or more radio modules in parallel (e.g., one or more of the modules 120 in FIG. 1B). The radio modules can be configured to operate on licensed frequency bands supported by the individual carriers. Specific network slices can be allocated or provisioned to specific radio modules, or multiple network slices can be allocated to a single radio module. The small cell site 300 can thereby support multiple network slices for a single operator, multiple network slices for multiple operators, multiple service types for a single operator or multiple operators, multiple network slices with unique slice differentiators (SD) within the same or different tracking areas, or multiple network slices with the same slice differentiators in different tracking areas. For example, the small cell site 300 can include a processor (not shown, e.g., a baseband processor) and memory where the memory stores instructions which when executed associate network slices with wireless network operators and associate the network slices to the radio modules. The small cell site 300 can also include storage to store configuration information. In some embodiments, individual equipment operators can lease and operate individual radio modules used to communicate to the operators' subscribers using the operators' licensed frequency bands and/or unlicensed frequencies. In other embodiments, a first network operator can operate a second network operator's network slice using the first network operator's radio module. The second network operator thereby enables communication for the second network operator's subscribers using the first network operators licensed frequency bands and/or unlicensed frequencies. In these embodiments, the first and second operators can operate under a roaming agreement and/or a network slicing agreement.

In some embodiments, the S-NSSAI includes a slice service type (SST) and an optional slice differentiator (SD) field. For example, SST values can range from 0-255 where a first range (e.g., 0-127) can be a standardized range and a second range (e.g., 128-255) can be an operator specific range. An operator's user equipment (UEs) can be configured with a certain SST value, and that SST value can be assigned to a specific slice configuration via a roaming/slice agreement (e.g., an operator's UEs can be assigned an SST value of 128 and the SST value of 128 can be assigned to an enhanced mobile broadband (eMBB) slice configuration). Other slice service types can be associated with different types of services or network characteristics, for example, a service type can be associated with massive internet of things (IoT) applications, another service type can be associated with ultra-reliable low latency communication (URLLC) to support autonomous driving, another slice service type can be associated with vehicle-to-everything (V2X) applications, etc. In some embodiments, in addition to the small cell site 300 or small cell 100 using SSTs and SDs to associate a network slice of a specified configuration to a network operator, the small cell site or small cell can also use device capabilities of the UEs (i.e., capabilities of wireless devices from different operators) and stored configuration information (e.g., subscription or operator policy information stored in the operators' core network) to perform the slice selection.

When an operator's (e.g., operator A) UE configured with a certain SST connects to small cell 100, the UE can generate NSSAI/S-NSSAI assistance information which the small cell 100 forwards to an Access and mobility Management Function (AMF). The AMF in turn can forward the request to operator's A Unified Data Management (UDM) function to confirm that operator A's UE is subscribed to the requested S-NSSAI. The small cell 100 and AMF can then set up a user plane session per the verified slice configurations stored in the core network's Network Slice Selection Function (NSSF). The session establishment sequence described above ensures that operator A's UE is logically separate from other UEs while sharing radio resources of small cell 100 (e.g., radio or baseband modules) with other UEs. As described above, operator A's UE can be simultaneously connected to multiple network slices. The same AMF can serve as a control anchor for a given UE for all the network slices that the UE can access. In some embodiments, the UE can access up to eight slices simultaneously through distinct protocol data unit (PDU) sessions where each PDU session is associated with one slice.

In some embodiments, the traffic from each of the supported network slices (e.g., traffic corresponding to S-NSSAI 1, 2, 3, and 4 or the collection, NSSAI, of the S-NSSAI's) is transported using a separate fiber optic pair (or electrical interface) 311 to a local facility 370 and/or a separate fiber optic pair (or electrical interface) 301 to another cell site. The fiber optic pairs (or electrical interfaces) 301 and 311 can be shared to transport the network slice traffic between the local facility and/or cell site. Microwave Ethernet transport (not shown in FIG. 3) can be utilized instead of shared fiber transport. The network slices can be terminated at local or regional facilities (e.g., local facility 370) and network slice tenants can provide a Data Network (DN) peering point with a gateway solution. For example, carrier 1's network slice (related to S-NSSAI 1) can be terminated at carrier 1 core network 371, and carrier network 2, 3, and 4 slices can be transported to carrier 2, 3, and 4 data networks (DN) 372, 373, and 374, respectively. For a shared interface for multiple slices, the individual slices can be logically separated on a shared fiber/microwave using, for example, VLAN Switching, MPLS, and/or routing.

In some embodiments, the network slicing features of the disclosed technology allow an operator to provision a specific network slice for roaming by 3rd party carriers while utilizing the slice operator's licensed frequency bands for customer access. In some embodiments, the network slicing features allow a slice operator to utilize unlicensed frequency bands where individual operators are allocated specific slice differentiators (SD) for network isolation from other operators. That is, each wireless device from a specific operator can include an S-NSSAI with an SD unique to the operator to differentiate other network slices from other operators with the same slice service type relating to unlicensed frequency operation.

Additionally, the small cell site 300 supporting multi-carrier network slicing can allow for Network as a Service (NAAS) deployments where a single operator or multiple operators can be tenants of the NAAS solution. That is, the NAAS solution supports per-operator/per-tenant network slices while isolating the network slices in the control and user planes. The NAAS solution provider uses its core network (e.g., their 5G core network) to integrate with any other tenant's/operator's core network for network slicing (i.e., roaming). Inter-operator communication for each operator's customers (UEs) are based on normalized roaming flows. In some embodiments, the NAAS solution provider (slice operator) can send all user plane and control plane traffic to the roaming operator so that the roaming UE can access network services through the roaming operator's network. In other embodiments, the NAAS solution provider (slice operator) can send only the control plane traffic to the roaming operator and the user plane traffic from/to the UE can go out to the roaming UE through the slice operator's network. Additionally, the NAAS solution provider can provide overall operational management, including prioritizing the processing and flow of all tenant control plane and use plane traffic. For example, the slice operator that provisions and deploys network slices for third party operators can include the parameters related to the network slices in a Unified Data Management (UDM) functional node. These parameters can include the NSSAIs, the third-party operator's authentication, authorization, and accounting (AAA) server address (IP, FQDN, etc.), configuration details regarding the network slices, etc.

In some embodiments, third-party operator network slice authentication is secondary to network authentication. For example, a subscriber UE of a third-party roaming operator can first authenticate into the slice operator's network, then the UE can send a registration request including the S-NSSAI(s) at which point the slice operator's network can authenticate the third-party operator for each required network slice. An Access and mobility Management Function (AMF) forwards the authentication requests to the UDM and the UDM forwards the roaming UE credentials to the roaming partner's (slice operator's) AAA servers for authentication. That is, the individual NSSAI authentication and authorization is secondary to conventional network authentication and authorization. In some embodiments, the UE can include the requested NSSAI(s) during the primary network authentication.

In some embodiments, the small cell site 300 can broadcast or transmit on licensed bands registered to third-party operators. In this case, the third-party operators can install their radio modules in small cell 100 and can operate and manage the radio modules via shared/separate fiber back to the third-party operator's Data Networks. In some embodiments, a UE can connect multiple network slices simultaneously or the slice operator can restrict the UE to an exclusive network slice.

The NAAS solution can support per-operator 5G Core Network integration with the operator's network slice(s) via, for example, dedicated radio modules or one or more radio modules bridged to specific optical and/or electrical interfaces for Ethernet or WDM. Additionally, dark fiber can be used and terminated into a tenant operator's network or WDM fiber can be used where the mux/demux termination equipment in a co-located facility that can switch the specific tenant's traffic into that tenant's network. On a shared backhaul/fronthaul link, MPLS VPNs can be used to label switch the tenant's traffic into the tenant's network and microwave radio links can also be used and terminated into the tenant operator's network. In some embodiments, individual operators/tenants can manage specific aspects of the dedicated radio modules and/or the optical and/or electrical communication interfaces and obtain performance statistics from the dedicated radio module(s). The third-party operator (i.e., tenant) can remotely access their dedicated radio module(s) via either separate or shared fiber/microwave access. The radio module(s) can be independently IP addressed from the tenant's IP space through their security. In embodiments with network slices that are operated on shared radio modules and managed by the slice operator, the tenant operators can access the performance statistics through defined application programming interfaces (APIs).

Figure 4:
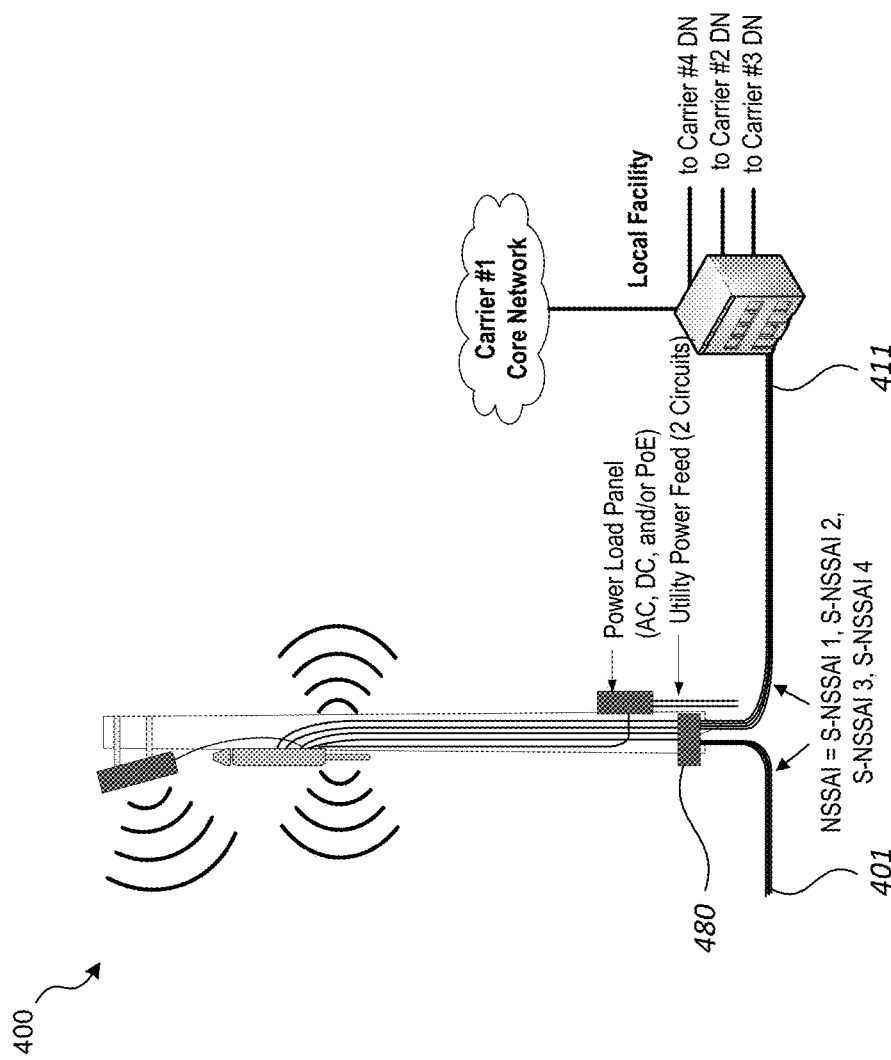
FIG. 4 is a block diagram of a representative small cell supporting multi-carrier network slicing using a wave-division multiplexing fiber pair per network slice.

FIG. 4 is a block diagram of a small cell site 400 with small cell 100 providing for multi-carrier network slicing using wave-division multiplexing (WDM) fiber pair per network slice. WDM fiber 401 transports individual network slices while WDM fiber 411 transports individual network slices towards a local facility. Color-aware small form-factor pluggable (SFP) optical transceivers can be used in the small cell site 400 where individual color-aware fiber pairs can be terminated into WDM mux/demux hardware 480.

Figure 5:
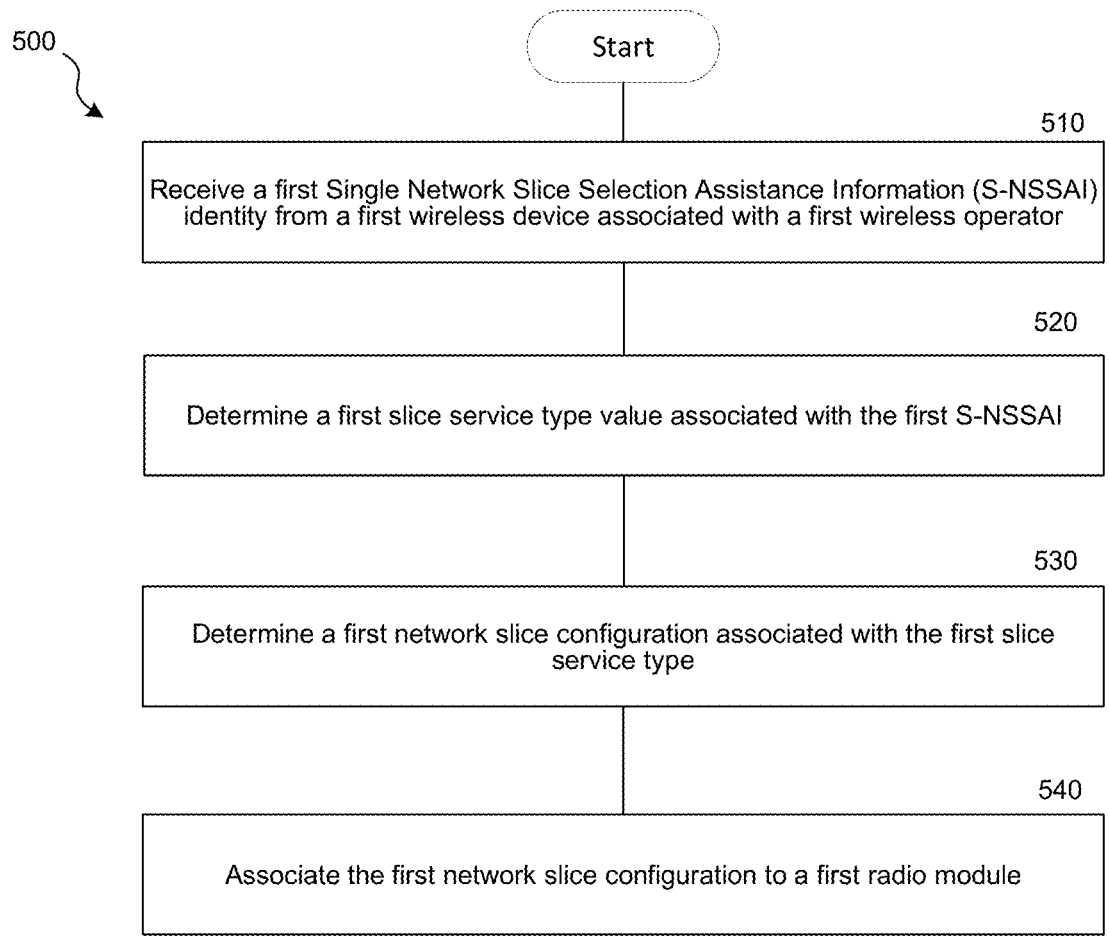
FIG. 5 is a flow diagram illustrating a representative method of allocating a multi-carrier network slice.

FIG. 5 is a flow diagram 500 illustrating a representative method of allocating a multi-carrier network slice. At block 510 a wireless cell (e.g., small cell site 300 of FIG. 3) receives a request for one or more network slices from one or more wireless devices associated with different wireless network operators (e.g., UEs that have subscribed to different network operators core networks). For example, at block 510, the small cell 100 receives a first S-NSSAI identity from a first wireless device (first UE) associated with a first wireless operator. As described above, the small cell 100 can forward the S-NSSAI to an Access and mobility Management Function (AMF) in the managing operator's core network (i.e., the CN of the operator managing the small cell). That is, the AMF can be in a core network different from the first wireless operator's core network. The AMF in turn can forward the S-NSSAI to a Unified Data Management (UDM) function to confirm that the first operator's first wireless device is subscribed to the requested S-NSSAI.

At block 520 the small cell 100 and/or the core network determines a slice service type (SST) value associated with the requested S-NSSAI. For example, at block 530, a Network Slice Selection Function (NSSF) in the core network determines based on the SST which core network slice instance is associated with the SST. The network slice instance is a set of network function (NF) instances and the resources required by those network functions, for example, compute resources, storage resources, networking resources, etc. Additionally, or alternative, the small cell 100 (e.g., the radio access network (RAN) portion) at block 530 can select a common control network function (CCNF) which includes a specific NSSF, where the specific NSSF associates a specific network resource slice configuration with the SST.

At block 540 the small cell 100 provisions the network resource slice configuration determined at block 530 to the wireless device. For example, the small cell 100 associates the network slice configuration to a radio module of the small cell appliance (e.g., small cell 100), where the radio module is associated with certain wireless devices associated with certain operators (e.g., wireless devices communicating through the radio access technology and frequency band configured in the radio module). In some embodiments, selection of which radio module of small cell 100 to associate to which network slice configuration (e.g., which RAN slice to select for a specific operator) is also based on the slice differentiator (SD) received in the wireless device's S-NSSAI at block 510. The small cell 100 (through selection of the radio module at block 540) can support traffic differentiation (e.g., QoS differentiation) between the pre-configured isolated RAN slices associated with different radio modules.

The small cell 100 can receive a second S-NSSAI identity from a second wireless device associated with a second wireless operator at block 510 and, at block 520, determine a second SST value associated with the second S-NSSAI. That is, as described above, different wireless devices associated with different wireless operators can send S-NSSAIs (or NSSAIs) where each S-NSSAI has a different SST value. At block 530, the small cell 100 and its associated core network can determine a second network slice configuration associated with the second SST and, at block 540, associate the second network resource slice configuration to a second radio module of the small cell 100 (as discussed above, the second network slice and the first network slice can both simultaneously be associated with the first radio module). The first radio module can be configured to operate with the first operator's wireless devices and the second radio module can be configured to operate with the second operator's wireless devices (e.g., by configuring antennas as described above).

In some embodiments, where the first SST is the same as the second SST, the first S-NSSAI can include a first slice differentiator (SD), and the second S-NSSAI can include a second SD. The first and second SDs can be used to select individual network slices having the same network characteristics (e.g., IoT slices) thereby isolating the traffic of the different slices.

Figure 6:
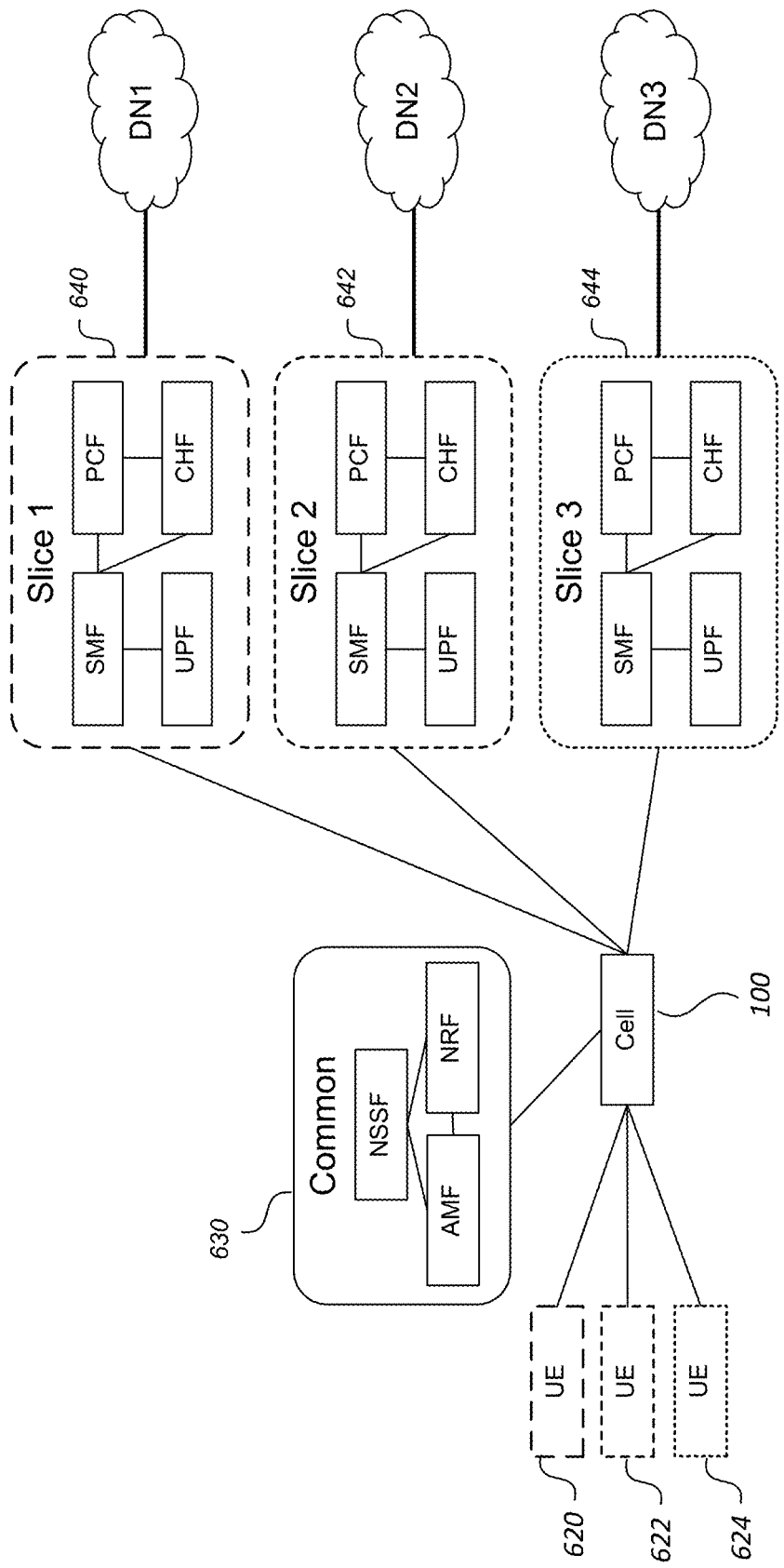
FIG. 6 is a block diagram illustrating multi-carrier network slicing.

FIG. 6 is a block diagram illustrating multi-carrier network slicing in a 5G NR network. Several UEs, e.g., UEs 620, 622, and 624, can request a network slice via cell 100 (e.g., a modular small cell with radio modules that are shareable between operators). For example, the UEs can send Network Slice Selection Assistance Information (NSSAI) parameters to a 5G NR network via small cell 100. As described above, S-NSSAIs can include the UEs' slice service types (SSTs) and slice differentiators (SDs). Small cell 100 can forward the NSSAI/S-NSSAI to block 630 which includes an Access and Mobility Function (AMF). The AMF together with a Unified Data Management (UDM) node (not shown in FIG. 6) confirm the UEs' authorization for to requested network slices. For example, if UE 620 requests network slice 2 represented by block 642, the AMF in block 630 can determine if UE 620 is authorized to be provisioned with slice 2 642. If UE 620 is authorized to be provisioned with slice 2 642, the AMF can setup up a user plane session based on configurations stored in the network slice selection function (NSSF) of block 630.

Figure 7:
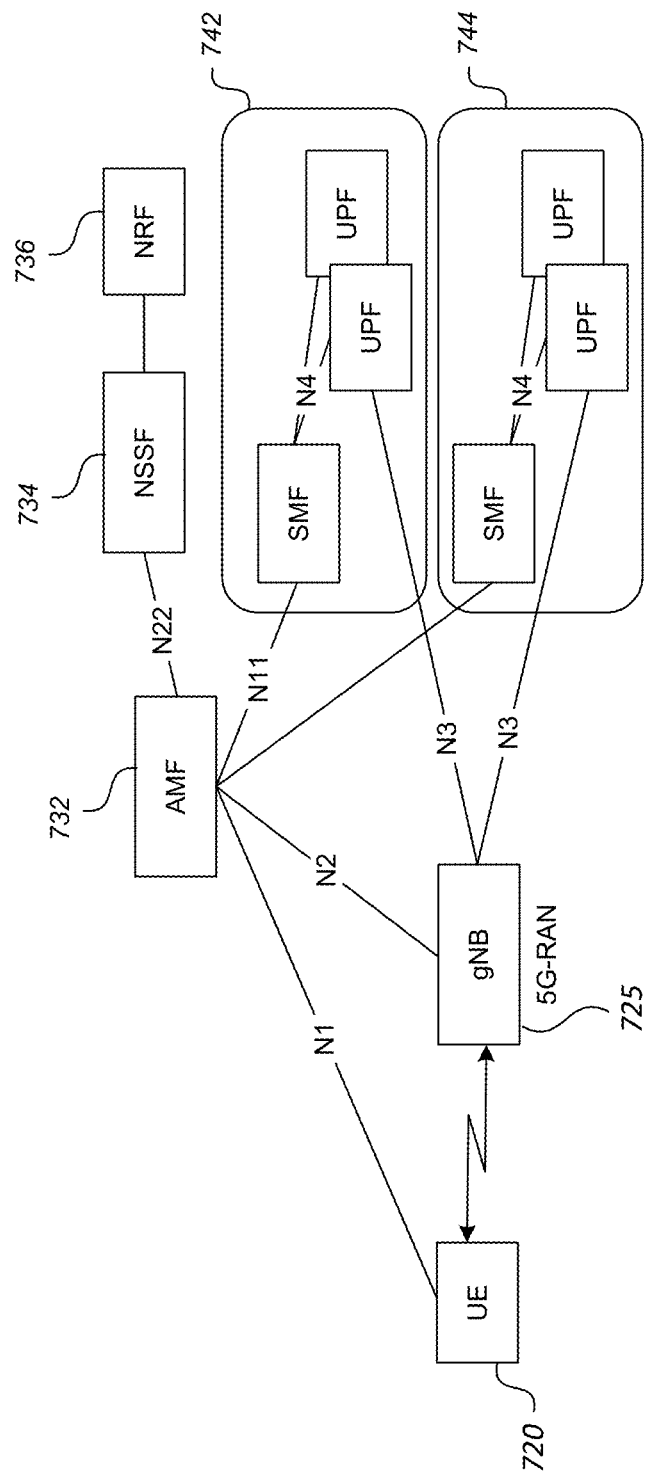
FIG. 7 is a block diagram illustrating another example of multi-carrier network slicing.

FIG. 7 is a block diagram illustrating another example of multi-carrier network slicing. The multicarrier network slice of FIG. 7 depicts two representative network slices, network resource slice 742 and network resource slice 744, for a UE 720. UE 720 accesses the network slices through a 5G Radio Access Network (RAN) gNB 725 (e.g., a small cell 100 of FIG. 3). An AMF 732 can serve as a control anchor for UE 720 for both slices 742 and 744. A Network Repository Function (NRF) 736 can allow network functions to discover the services offered by other network functions. The NRF 736 also supports a service discovery function by maintaining a set of network function profiles and a set of available network function instances.

As part of UE 720's initial registration and PDU establishment procedure, the 5G-RAN 725 selects AMF 732 based on NSSAI requested by the UE 720. AMF 732 fetches subscription data from a UDM (not shown in FIG. 7) and requests NSSF 734 to select a network slice instance or network slice instances matching the subscribed S-NSSAI (s) in the NSSAI. For example, NSSF 734 can select one of slice 742 or 744 or both that is available to the operator of UE 720. The NSSF 734 also discovers which AMF(s) can serve the allowed network slice instances by sending allowed S-NSSAI(s) to the NRF. The NRF 736 provides AMF candidate(s) to the NSSF (e.g., AMF 732 or other AMF(s)). The AMF 732 notifies UE 720, through the 5G-RAN 725, about the allowed S-NSSAI(s) and if a different AMF needs to be selected, AMF 732 redirects the request to that AMF.

In some embodiments, the network slices 742 and 744 can be accessed by the same operator, and in other embodiments they are only accessible by different operators. For example, if network slice 742 is associated with an operator serving UE 720, then only that slice can be assigned to UE 720 and network slice 744 would be reserved for assignment to other UEs served by a different operator associated with network slice 744. On the other hand, if both network slice 742 and network slice 744 are accessible by UE 720, then UE 720 can request and be assigned one or both network slices and each network slice can provide a different network service.

Figure 8:
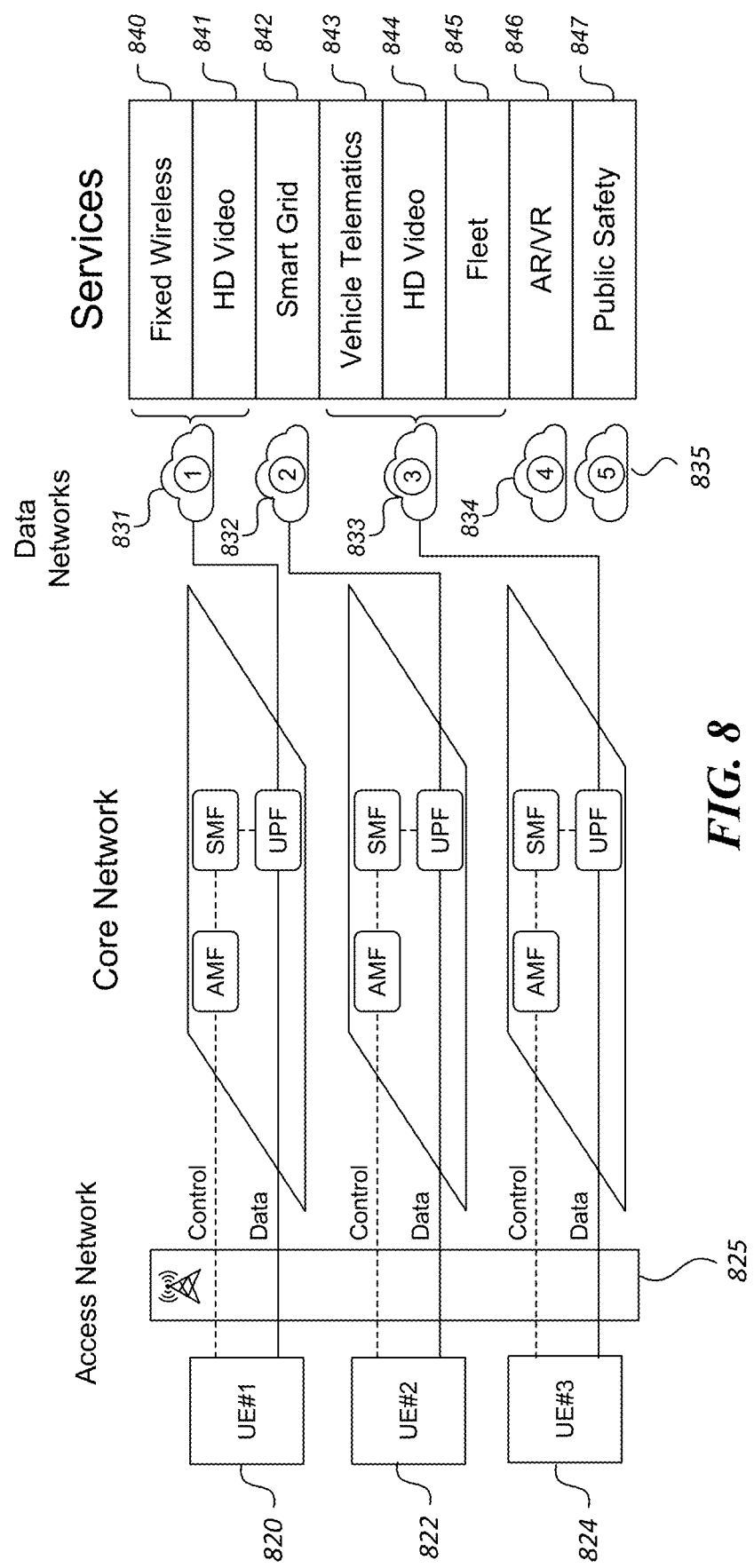
FIG. 8 is a block diagram illustrating multi-carrier and multi-service network slicing.

FIG. 8 is a block diagram illustrating multi-carrier and multi-service network slicing. For example, a UE #1 820 and UE #2 822 can be associated with a first operator, and UE #3 824 can be associated with a second different and independent operator. Through an access network 825 (e.g., comprising small cell 100 of FIG. 3), the UEs request network slices optimized for different services.

For example, UE #1 820 (e.g., a customer premise equipment (CPE)) can request and be assigned two network slices, slice 840 adapted or optimized for fixed wireless access (e.g., cable replacement to provide internet to the home or business), and slice 841 adapted for high definition (HD) video surveillance (e.g., backhaul of CCTV cameras in the home or business). UE #2 822 can be a cellular radio in a remote utility site (e.g., a remote terminal unit (RTU)) and can be assigned a slice 842 adapted for smart grid services. UE #3 824 can be assigned slice 843 (adapted for vehicle telematics), slice 844 (adapted for HD video), and slice 845 (adapted for fleet management, e.g., vehicle tracking).

In some embodiments, the different slices described above can be part of the same data network. For example, slice 840 and slice 841 are part of data network 831; slice 843, slice 844, and slice 845 are part of the data network 833. In some embodiments, the slices can be part of different data networks or a data network supports a single slice or service. For example, slice 842 is associated with data network 832, slice 846 with data network 834, and slice 847 with data network 835.

In the example of FIG. 8, slice 846 (adapted for Augmented Reality and Virtual Reality (AR/VR)) and slice 847 (adapted for public safety such first responder communication networks, e.g., FirstNet) have not been assigned to a UE but are available should a UE request such services (e.g., if a UE provides matching SST and SD in NSSAI) and if the operator associated with that UE is allowed to access those services.

Overall, the present embodiments provide many improvements over traditional distributed-antenna systems (DAS), separate from network slicing. For example, the present embodiments allow for:

fewer antennas than traditional DAS in embodiments where multiple operators share radio modules;

modular or small cells with multiple radio/baseband modules corresponding to multiple network slices;

shared backhaul and/or fronthaul to a central site or to downstream cell sites;

incorporating layer 3 routing and/or layer 2 into a small cell device;

utilizing C/DWDM (course/dense wave division multiplexing) and MPLS VPN where operators share radio modules unlike typical DAS deployments where each operator deploys their radio modules in the DAS; and so on.

The Figures and above description provide a brief, general description of a suitable environment in which the invention can be implemented. Although not required, aspects of the invention can be implemented in the general context of computer-executable instructions, such as routines executed by a general-purpose data processing device, e.g., a server computer, wireless device or personal computer. Those skilled in the relevant art will appreciate that aspects of the invention can be practiced with other communications, data processing, or computer system configurations. The terms "computer," "server," and the like are generally used interchangeably herein, and refer to any of the above devices and systems, as well as any data processor.

Aspects of the invention can be embodied in a special purpose computer or data processor that is specifically programmed, configured, or constructed to perform one or more of the computer-executable instructions explained in detail herein. While aspects of the invention, such as certain functions, are described as being performed exclusively on a single device or single computer, the invention can also be practiced in distributed environments where functions or modules are shared among disparate processing devices, which are linked through a communications network, such as a Local Area Network (LAN), Wide Area Network (WAN), or the Internet. In a distributed computing environment, program modules can be in both local and remote memory storage devices. Aspects of the invention can be stored or distributed on tangible computer-readable media, including magnetically or optically readable computer discs, hard-wired or preprogrammed chips (e.g., EEPROM semiconductor chips), nanotechnology memory, biological memory, or other data storage media.

Unless the context clearly requires otherwise, throughout the description and the claims, the words "comprise," "comprising," and the like are to be construed in an inclusive sense, as opposed to an exclusive or exhaustive sense; in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations can perform routines having steps/blocks, or employ systems having blocks, in a different order, and some processes or blocks can be deleted, moved, added, subdivided, combined, and/or modified to provide alternative or subcombinations. Each of these processes or blocks can be implemented in a variety of different ways. Also, while processes or blocks are at times shown as being performed in series, these processes or blocks can instead be performed or implemented in parallel or can be performed at different times. Further any specific numbers noted herein are only examples: alternative implementations can employ differing values or ranges.

The teachings of the invention provided herein can be applied to other systems, not necessarily the system described above. The elements and acts of the various examples described above can be combined to provide further implementations of the invention. Some alternative implementations of the invention can include not only additional elements to those implementations noted above, but also can include fewer elements.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. When statements or subject matter in an incorporated by reference conflict with statements or subject matter of this application, then this application shall control.

These and other changes can be made to the invention in light of the above Detailed Description. While the above description describes certain examples of the invention, and describes the best mode contemplated, no matter how detailed the above appears in the text, the invention can be practiced in many ways. Details of the system can vary considerably in its specific implementation, while still being encompassed by the invention disclosed herein. As noted above, the terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples but also all equivalent ways of practicing or implementing the invention under the claims.

To reduce the number of examples, certain aspects of the invention are presented below in certain claim forms, but the applicant contemplates the various aspects of the invention in any number of claim forms. For example, certain aspects of the disclosed system can be embodied as a means-plus-function claim, or in other forms, such as being embodied in a computer-readable medium. (Any claims intended to be treated under 35 U.S.C. § 112(f) will begin with the words "means for" but use of the term "for" in any other context is not intended to invoke treatment under 35 U.S.C. § 112(f).) Accordingly, the applicant reserves the right to pursue additional claims after filing this application to pursue such additional claim forms, in either this application or in a continuing application.

I claim:

1. A system configured to provision network slices to wireless devices within wireless networks of wireless service providers, the system comprising:
   multiple radio modules configured to communicate with one or more of the wireless devices in one or more of the wireless networks
      wherein the multiple radio modules are co-located in a single enclosure;
   at least one processor coupled to the multiple radio modules; and
   at least one non-transitory memory, coupled to the at least one processor, and storing instructions that, when executed by the at least one processor, cause the system to:
      concurrently associate multiple network slices with respective wireless service providers; and
      associate the multiple network slices to the multiple radio modules,
         wherein the respective wireless service providers are independent wireless service providers that each own and manage separate wireless networks.

2. The system of claim 1, wherein two or more of the wireless networks of two or more of the wireless service providers are configured to wireless communicate with one radio module of the multiple radio modules.

3. The system of claim 1, wherein two or more of the wireless service providers are associated with one radio module of the multiple radio modules.

4. The system of claim 1 further comprising:
   one or more antennas; and
   a system controller configured to allocate the one or more antennas to the multiple radio modules based on a stored configuration information.

5. The system of claim 1, wherein each one of the multiple network slices comprises a unique slice differentiator and the network slices is associated with respective wireless devices operating in a common tracking area.

6. The system of claim 1, wherein each one of the multiple network slices comprises a unique slice differentiator and the multiple network slices is associated with respective wireless devices operating in a different tracking area.

7. The system of claim 1, wherein each one of the multiple network slices comprises a same slice differentiator and the multiple network slices is associated with respective wireless devices operating in different tracking areas.

8. The system of claim 1 further comprising:
   a power supply configured to provide electrical power based on a number of network slices associated with the multiple radio modules.

9. The system of claim 1, wherein each one of the multiple network slices comprises at least one of a slice service type and a slice differentiator.

10. The system of claim 9:
wherein the slice service type defines a network characteristic of the network slice, and
wherein the network characteristic is at least one of an enhanced mobile broadband characteristic, an ultra-reliable low latency communication characteristic, a vehicle-to-everything characteristic, and a massive internet of things characteristic.

11. The system of claim 1, wherein the non-transitory memory is further configured to store instructions for associating a slice service type value to a network slice of the network slices, and wherein the respective wireless devices are configured with the slice service type value.

12. The system of claim 11, wherein the slice service type value identifies a wireless service provider and a network slice resource configuration for the wireless service provider.

13. The system of claim 11, wherein the network slice is associated with a radio module configured for unlicensed frequency operation, and the respective wireless devices associated with the wireless service provider are configured with a slice differentiator value that is different from a slice differentiator value associated with wireless devices associated with a different wireless service provider.

14. The system of claim 1, wherein the system is further caused to:
prior to concurrently associating the multiple network slices with respective wireless service providers,
receive a request for multiple network resource slices from the one or more of the wireless devices,
wherein the request for the multiple network slices comprises a network slice selection assistance information (NSSAI) having multiple single network slice selection assistance information values (S-NSSAI).

15. A computer-readable storage medium, excluding transitory signals and carrying instructions, which, when executed by at least one data processor of a system for provisioning network slices to wireless devices within wireless networks of wireless service providers, cause the system to:
concurrently associate multiple network slices with respective wireless service providers of one or more wireless service providers; and
associate the multiple network slices to multiple radio modules of the system
wherein the multiple radio modules are configured to communicate with one or more of the wireless devices in the respective wireless devices,
wherein the multiple radio modules are co-located in a single enclosure, and
wherein the respective wireless service providers are independent wireless service providers that each own and manage separate wireless networks.

16. The computer-readable storage medium of claim 15, wherein each of the multiple network slices is adapted for each of the wireless service providers.

17. The computer-readable storage medium of claim 15, wherein the multiple radio modules are software reconfigurable to support the respective wireless service providers with respective operator radio access technologies and frequency bands.

18. A method for provisioning network slices to wireless devices within wireless networks of wireless service providers, the method comprising:
concurrently associating multiple network slices with respective wireless service providers; and
associating the multiple network slices to multiple radio modules,
wherein the multiple radio modules are configured to communicate with one or more of the wireless devices in one or more of the wireless networks,
wherein the multiple radio modules are co-located in a single enclosure and
wherein the respective wireless service providers are independent wireless service providers that each own and manage separate wireless networks.

19. The method of claim 18, further comprising:
prior to concurrently associating the multiple network slices with respective wireless service providers,
receiving a request for multiple network slices from the one or more of the wireless devices,
wherein the request for the multiple network slices comprises a network slice selection assistance information (NSSAI) having single network slice selection assistance information values (S-NSSAI), and
wherein a S-NSSAI comprises a slice differentiator (SD) and a slice service type (SST) including an enhanced mobile broadband service, an ultra-reliable low latency communication service, a vehicle-to-everything service, or a massive internet of things service.

20. The method of claim 18, wherein each of the multiple radio modules is identified by a Network Slice Selection Assistance Information (NSSAI) value or a Network Slice instance value.

* * * * *